United States Patent
Oguchi et al.

(10) Patent No.: US 10,492,517 B2
(45) Date of Patent: *Dec. 3, 2019

(54) ACIDIC OIL-IN-WATER TYPE EMULSIFIED CONDIMENT

(71) Applicant: KEWPIE CORPORATION, Tokyo (JP)

(72) Inventors: Kaori Oguchi, Tokyo (JP); Koji Nishi, Tokyo (JP)

(73) Assignee: KEWPIE CORPORATION, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 15/100,202

(22) PCT Filed: Nov. 27, 2014

(86) PCT No.: PCT/JP2014/081478
§ 371 (c)(1),
(2) Date: May 27, 2016

(87) PCT Pub. No.: WO2015/080233
PCT Pub. Date: Jun. 4, 2015

(65) Prior Publication Data
US 2017/0020177 A1    Jan. 26, 2017

(30) Foreign Application Priority Data

Nov. 29, 2013   (JP) .................... 2013-248156

(51) Int. Cl.
*A23L 27/60*   (2016.01)

(52) U.S. Cl.
CPC ........... *A23L 27/60* (2016.08); *A23V 2002/00* (2013.01)

(58) Field of Classification Search
CPC ....................................... A23L 27/60
See application file for complete search history.

(56) References Cited

U.S. PATENT DOCUMENTS

| | | |
|---|---|---|
| 4,146,652 A | 3/1979 | Kahn et al. |
| 4,746,524 A | 5/1988 | Meyer |
| 2002/0009518 A1* | 1/2002 | Soe ................ A23D 7/011 426/33 |
| 2002/0076476 A1 | 6/2002 | Kuil et al. |
| 2003/0203096 A1 | 10/2003 | Hamm et al. |
| 2005/0220969 A1 | 10/2005 | Loh et al. |
| 2012/0183669 A1* | 7/2012 | Oguchi ............... A23L 27/60 426/605 |
| 2012/0251685 A1* | 10/2012 | Wang-Nolan ....... A23D 7/0053 426/250 |

FOREIGN PATENT DOCUMENTS

| | | |
|---|---|---|
| CN | 103458856 | 12/2013 |
| EP | 0 970 619 | 1/2000 |
| EP | 2561764 A | 2/2013 |
| JP | 58047450 A | 3/1983 |
| JP | 01-141570 | 6/1989 |
| JP | 9-23845 | 1/1997 |
| JP | 2004-512037 A | 2/2004 |
| JP | 2007-185138 A | 7/2007 |

OTHER PUBLICATIONS

Extended European Search Report dated Jun. 14, 2017 in corresponding European patent application No. 14866474.1.
Office Action dated May 29, 2018 in corresponding Japanese patent application No. 2015-551005, with English Machine Translation.
Chinese Office Action dated Sep. 30, 2018 in corresponding Chinese patent application No. 201480065184.8, with English Machine Translation.
Office Action dated Jan. 28, 2019 in corresponding Malaysian Patent Application No. PI 2016701861.
Schmidt et al., "Water Activity Values of Select Food Ingredients and Products", Water Activity in Foods: Fundamentals and Applications, Blackwell Publishing and the Institute of Food Technologists, Ames, Iowa, USA, 2008, pp. 407-420.
Office Action dated Apr. 17, 2019 in corresponding Chinese Patent Application No. 201480065184.8, with Machine English Translation.

* cited by examiner

*Primary Examiner* — Jenna A Watts
(74) *Attorney, Agent, or Firm* — Wenderoth, Lind & Ponack, L.L.P.

(57) ABSTRACT

Disclosed is an acidic oil-in-water type emulsified condiment comprising one or more chelating agents selected from citric acid, malic acid, phosphoric acid, lactic acid, succinic acid, fumaric acid, gluconic acid, and EDTA, acetic acid, a sugar, a yolk, an edible oil, a thickener, and water, wherein the content of the edible oil is 1 to 40% by mass, and the acidic oil-in-water type emulsified condiment has a water activity of 0.90 to 0.96, a pH of 3.0 to 4.0, a viscosity (20° C.) of 50 to 600 Pa·s, and a b* value of 10 to 20 in an L*a*b* color system when preserved at 40° C. for 4 months.

8 Claims, No Drawings

ACIDIC OIL-IN-WATER TYPE EMULSIFIED CONDIMENT

FIELD OF THE INVENTION

The present invention relates to an acidic oil-in-water type emulsified condiment. More specifically, the present invention relates to an acidic oil-in-water type emulsified condiment that resists syneresis even if preserved for a long period, in spite of its low edible oil content.

BACKGROUND OF THE INVENTION

Acidic oil-in-water type emulsified condiments may have a reduced edible oil content for the purpose of reducing their calories. Such an acidic oil-in-water type emulsified condiment having a reduced edible oil content is less likely to produce viscosity even in the oil-in-water emulsion. Therefore, as proposed by, for example, Japanese Patent Publication No. 7-112414 (Patent Literature 1), a thickener such as a starch is often added thereto for the purpose of increasing the viscosity.

CITATION LIST

Patent Literature

Patent Literature 1: Japanese Patent Publication No. 7-112414

SUMMARY OF THE INVENTION

Technical Problem

A low edible oil content, however, might cause syneresis during preservation for a long period, even though the thickener is contained for the purpose of increasing the viscosity mentioned above. Particularly, this tendency is strong for preservation at a high temperature, for example, 40° C.

Thus, the present invention provides an acidic oil-in-water type emulsified condiment that resists syneresis even if preserved for a long period, in spite of its low edible oil content.

Solution to Problem

The inventors of the present application have conducted diligent studies and consequently completed the present invention by finding that the acidic oil-in-water type emulsified condiment that resists syneresis even if preserved for a long period can be provided by decreasing the pH as compared with conventional acidic oil-in-water type emulsified condiments, further decreasing the water activity to within a specific range, and further controlling a specific state by the adjustment of ingredients such as an acid, a protein, and a sugar such that chemical change does not proceed during the preservation.

Specifically, the present invention is:

(1) an acidic oil-in-water type emulsified condiment comprising one or more chelating agents selected from citric acid, malic acid, phosphoric acid, lactic acid, succinic acid, fumaric acid, gluconic acid, and EDTA, acetic acid, a sugar, a yolk, an edible oil, a thickener, and water, wherein the content of the edible oil is 1 to 40% by mass, and the acidic oil-in-water type emulsified condiment has a water activity of 0.90 to 0.96,
a pH of 3.0 to 4.0,
a viscosity (20° C.) of 50 to 600 Pa·s, and
a b* value of 10 to 20 in an L*a*b* color system when preserved at 40° C. for 4 months;

(2) the acidic oil-in-water type emulsified condiment according to (1), wherein the acidic oil-in-water type emulsified condiment comprises at least glucose as the sugar;

(3) the acidic oil-in-water type emulsified condiment according to (1) or (2), wherein the acidic oil-in-water type emulsified condiment comprises 0.1 to 40% of glucose;

(4) the acidic oil-in-water type emulsified condiment according to any of (1) to (3), wherein the protein content is 0.2 to 3%; and (5) the acidic oil-in-water type emulsified condiment according to any of (1) to (4), wherein the content of the edible oil is 1 to 20% by mass.

Advantageous Effects of Invention

The acidic oil-in-water type emulsified condiment of the present invention can provide an acidic oil-in-water type emulsified condiment that resists syneresis even if preserved for a long period, in spite of its low edible oil content.

DETAILED DESCRIPTION OF THE PREFERRED EMBODIMENTS

Hereinafter, the present invention will be described in detail. In the present invention, the term "part" means "part by mass," and the term "%" means "% by mass," unless otherwise specified.

<Features of Present Invention>

The acidic oil-in-water type emulsified condiment of the present invention is an acidic oil-in-water type emulsified condiment such as a mayonnaise, a dressing, or a tartar sauce and is a low-oil acidic oil-in-water type emulsified condiment having an edible oil content of 1 to 40% by mass. As mentioned later, its pH is 3 to 4, and its water activity is 0.90 to 0.96. Thus, both the pH and the water activity are adjusted to lower levels than those of a conventional acidic oil-in-water type emulsified condiment. Furthermore, the acidic oil-in-water type emulsified condiment of the present invention resists syneresis even if preserved for a long period, in spite of its low edible oil content, by adjusting ingredients such as a protein of a yolk or the like, a sugar, and a chelating agent within such ranges of low pH and low water activity and setting a b* value after preservation for a given period at a high temperature to 10 to 20 as a measurement value.

<Acidic Oil-In-Water Type Emulsified Condiment>

The product form of the acidic oil-in-water type emulsified condiment of the present invention is an acidic oil-in-water type emulsified condiment having a pH of 4.6 or lower, such as a mayonnaise or a semi-solid emulsified dressing containing an edible oil, vinegar, and a yolk.

<Water Activity>

In the acidic oil-in-water type emulsified condiment of the present invention, the respective amounts of the ingredients to be mixed are preferably appropriately adjusted such that the water activity is 0.90 or higher and 0.96 or lower. The acidic oil-in-water type emulsified condiment having a water activity of 0.90 or higher and 0.96 or lower, 0.90 or higher and 0.95 or lower, 0.90 or higher and 0.94 or lower, and particularly 0.92 or higher and 0.95 or lower, or 0.92 or higher and 0.94 or lower can resist syneresis even if preserved for a long period.

In the present invention, the water activity can be adjusted by adjusting the amounts of a sugar, common salt, and the like to be mixed.

<pH>

The pH of the acidic oil-in-water type emulsified condiment of the present invention is 3.0 or higher and 4.0 or lower. The pH is particularly preferably 3.2 or higher and 3.7 or lower, or 3.2 or higher and 3.6 or lower.

The acidic oil-in-water type emulsified condiment having a pH of 4.0 or lower and particularly 3.7 or lower, or 3.6 or lower can resist syneresis even if preserved for a long period. Also, the acidic oil-in-water type emulsified condiment having a pH of 3.0 or higher and particularly 3.2 or higher can also have preferred flavor.

In the present invention, the pH can be adjusted by adjusting the amounts of acetic acid, a chelating agent, a protein or a proteolytic digest thereof, an amino acid, and the like to be mixed.

<Viscosity>

The viscosity of the acidic oil-in-water type emulsified condiment of the present invention is 50 Pa·s or higher and 600 Pa·s or lower in order to resist syneresis even if preserved for a long period. The viscosity is particularly preferably 75 Pa·s or higher and 600 Pa·s or lower, further preferably 100 Pa·s or higher and 500 Pa·s or lower.

In this context, the viscosity of the acidic oil-in-water type emulsified condiment of the present invention is a value calculated from a reading 1 minute after the start of measurement by assaying a test sample having a product temperature of 20° C. in a BH type viscometer under conditions involving the number of rotations of 2 rpm using rotor No. 4 when the viscosity is 37.5 Pas or higher and lower than 75 Pa·s, rotor No. 5 when the viscosity is 75 Pa·s or higher and lower than 150 Pa·s, rotor No. 6 when the viscosity is 150 Pa·s or higher and lower than 375 Pa·s, and rotor No. 7 when the viscosity is 375 Pa·s or higher.

<b* Value in L*a*b* Color System when Acidic Oil-In-Water Type Emulsified Condiment is Preserved at 40° C. for 4 Months>

The acidic oil-in-water type emulsified condiment of the present invention has a b* value of 10 to 20, more preferably 10 to 18, in an L*a*b* color system when preserved at 40° C. for 4 months. This measurement can be carried out by preserving the acidic oil-in-water type emulsified condiment packaged in a container at 40° C. for 4 months and assaying the acidic oil-in-water type emulsified condiment thus preserved as a sample in accordance with JIS Z 8722 "Methods of color measurement—Reflecting and transmitting objects." The measurement value of the b* value can be obtained using, for example, a color difference meter (model name "Color Meter ZE2000," manufactured by Nippon Denshoku Industries, Co., Ltd.).

<Sugar>

The acidic oil-in-water type emulsified condiment of the present invention contains a sugar.

Any sugar can be used in the acidic oil-in-water type emulsified condiment of the present invention as long as the water activity of the acidic oil-in-water type emulsified condiment itself can be adjusted to within the range mentioned above.

Examples thereof include: monosaccharides such as glucose, galactose, fructose, mannose, and N-acetylglucosamine; disaccharides such as lactose, maltose, sucrose, cellobiose, and trehalose; oligosaccharides in which 3 to 7 monosaccharides are bonded; glucose-fructose syrup; and sugar alcohols obtained by the reduction treatment of these sugars. On the other hand, starches or gum substances for use as a thickener are not included in the sugar described herein.

Among these sugars, glucose is preferred because glucose resists discoloration and facilitates adjusting the b* value to 10 to 20 in an L*a*b* color system when the acidic oil-in-water type emulsified condiment is preserved at 40° C. for 4 months.

<Content of Sugar>

The content of the sugar differs depending on the type of the sugar and is preferably 3% or larger and 40% or smaller, more preferably 5% or larger and 40% or smaller, 3% or larger and 35% or smaller, 5% or larger and 35% or smaller, or 5% or larger and 30% or smaller. The acidic oil-in-water type emulsified condiment preferably contains at least 0.1% or larger and 40% or smaller, more preferably 0.5% or larger and 30% or smaller, of glucose among the sugars, from the viewpoint of resisting syneresis even if preserved for a long period.

<Chelating Agent>

Examples of the chelating agent include one or more selected from citric acid, malic acid, phosphoric acid, lactic acid, succinic acid, fumaric acid, gluconic acid, and EDTA. Among these chelating agents, at least one or more selected from citric acid, malic acid, phosphoric acid, and lactic acid are preferably used from the viewpoint of facilitating adjusting the b* value to 10 to 20 in an L*a*b* color system when the acidic oil-in-water type emulsified condiment is preserved at 40° C. for 4 months, and from the viewpoint of flavor.

<Acetic Acid>

The present invention contains acetic acid from the viewpoint of flavor. The content of the acetic acid is preferably 0.001 to 0.7%, more preferably 0.001 to 0.5%.

<Yolk>

The yolk used in the acidic oil-in-water type emulsified condiment of the present invention is not particularly limited as long as the yolk is an edible yolk generally used. Examples thereof include raw yolk as well as the raw yolk subjected to one or two or more treatments such as sterilization, freezing, drying (e.g., spray drying or freeze drying), an enzymatic treatment with phospholipase A1, phospholipase A2, phospholipase C, phospholipase D, or protease, etc., desugaring with yeast or glucose oxidase, etc., decholesterolization (e.g., a supercritical carbon dioxide treatment), and mixing with common salt or sugars, etc. Particularly, the enzymatically treated yolk mentioned above, particularly, the yolk enzymatically treated with phospholipase A1 or phospholipase A2, i.e., lysed yolk, can be used from the viewpoint of stabilizing the dispersed state of oil droplets.

<Content of Yolk>

The content of the yolk is preferably 0.1 to 5% (in terms of solid content), more preferably 0.5 to 4% (in terms of solid content), particularly preferably 1 to 3% (in terms of solid content), from the viewpoint of facilitating adjusting the b* value to 10 to 20 in an L*a*b* color system when the acidic oil-in-water type emulsified condiment is preserved at 40° C. for 4 months, and from the viewpoint of flavor.

<Edible Oil>

The acidic oil-in-water type emulsified condiment of the present invention can contain an edible oil as a principal ingredient of an oil phase.

The edible oil is not particularly limited as long as the edible oil is any of various edible oils used in conventional acidic oil-in-water type emulsified condiments. Specifically, one of or a combination of two or more of, for example, animal or plant oils (e.g., rapeseed oil, soybean oil, corn oil, safflower oil, sunflower oil, cottonseed oil, sesame oil, rice oil, palm oil, palm olein, olive oil, peanut oil, coconut oil, perilla oil, cream, beef tallow, lard, and fish oil) and oils obtained by their chemical or enzymatic treatment, such as purified oils, medium-chain fatty acid triglycerides, and transesterified oils, can be contained in the acidic oil-in-water type emulsified condiment.

The edible oil may be contained therein by mixing raw materials, such as dairy cream or milk, containing the edible oil.

<Content of Edible Oil>

The content of the edible oil is preferably 1% or larger and 40% or smaller, more preferably 1% or larger and 35% or smaller, or 5% or larger and 35% or smaller, particularly preferably 20% or larger and 30% or smaller.

The acidic oil-in-water type emulsified condiment containing the edible oil in the range mentioned above can resist syneresis even if preserved for a long period and can also be preferred from the viewpoint of taste.

<Water>

In the acidic oil-in-water type emulsified condiment of the present invention, water is contained by using water as a raw material for the production of the acidic oil-in-water type emulsified condiment or contained as water contained in the chelating agent, acetic acid, a thickener, the yolk, and the like.

<Content of Water>

In the acidic oil-in-water type emulsified condiment of the present invention, the content of the water is 30 to 60% from the viewpoint of preferred taste. Particularly, the acidic oil-in-water type emulsified condiment having a water content of 30 to 50% can resist syneresis even if preserved for a long period and can also be preferred from the viewpoint of taste.

<Thickener>

The acidic oil-in-water type emulsified condiment of the present invention contains a thickener such that its viscosity (20° C.) is 50 Pa·s or higher and 600 Pa·s or lower as mentioned above.

The thickener is not particularly limited as long as the thickener is edible. Examples thereof include starches and gum substances. One or two or more of the specific examples of the thickener mentioned later can be used.

Examples of the gum substances include carrageenan, tamarind seed gum, locust bean gum, xanthan gum, guar gum, tara gum, Cassia gum, glucomannan, gelatin, agar, and gellan gum.

Examples of the starches include potato starch, corn starch, tapioca starch, wheat starch, rice starch, processed starches obtained by a treatment, such as gelatinization or cross-linking, of these starches, and their heat-moisture treated starches.

<Protein>

The acidic oil-in-water type emulsified condiment of the present invention can contain a protein. The protein is not particularly limited as long as the protein is edible. Examples of the protein include proteins derived from the yolk or from albumen, milk proteins, and soy proteins.

The content of the protein can be 0.2% or larger and 3% or smaller from the viewpoint of facilitating adjusting the b* value to 10 to 20 in an L*a*b* color system when the acidic oil-in-water type emulsified condiment is preserved at 40° C. for 4 months, and from the viewpoint of flavor. The mass ratio of the content of the sugar to the content of the protein is 1 or larger and 200 or smaller and particularly 5 or larger and 50 or smaller from the viewpoint of facilitating adjusting the b* value to 10 to 20 in an L*a*b* color system when the acidic oil-in-water type emulsified condiment is preserved at 40° C. for 4 months, and from the viewpoint of flavor.

<Other Ingredients>

The acidic oil-in-water type emulsified condiment of the present invention can contain ingredients appropriately selected from various raw materials usually used in acidic oil-in-water type emulsified condiments, in addition to the ingredients mentioned above without impairing the effects of the present invention. Examples thereof can include: various seasoning agents such as sodium glutamate, common salt, and sugars; antioxidants such as ascorbic acid and salts thereof, and vitamin E; spices such as various extracts, mustard flour, and pepper; various proteins and proteolytic digests thereof; dice-shaped boiled eggs; and chopped vegetables such as pickled cucumbers, onions, and parsley. Of these ingredients, at least common salt, a seasoning agent, and a sugar are preferably contained therein.

<Method for Producing Acidic Oil-In-Water Type Emulsified Condiment>

The method for producing the acidic oil-in-water type emulsified condiment of the present invention can follow a routine method. More specifically, examples of the method for producing the acidic oil-in-water type emulsified condiment of the present invention can include a method which involves: uniformly mixing aqueous-phase raw materials; crudely emulsifying the mixture by pouring oil-phase raw materials with stirring using a mixer or the like; next, finely emulsifying the mixture using a colloid mill or the like; and then filling a bottle container, a glass container, or the like, with the emulsion, followed by hermetically sealing.

EXAMPLES

Hereinafter, the acidic oil-in-water type emulsified condiment of the present invention will be further described with reference to Examples and Comparative Examples. However, the present invention is not intended to be limited by these examples.

Examples 1 to 4 and Comparative Examples 1 and 2

Each acidic oil-in-water type emulsified condiment was prepared according to the formulation of Table 1 described below. Specifically, aqueous-phase raw materials were uniformly mixed. This mixture was crudely emulsified by pouring oil-phase raw materials with stirring using a mixer or the like. Next, the obtained crude emulsion was finely emulsified using a colloid mill or the like to prepare an acidic oil-in-water type emulsified condiment.

Test Example 1

The acidic oil-in-water type emulsified condiment obtained in each of Examples 1 to 4 and Comparative Examples 1 and 2 was assayed for (a) pH, (b) water activity, and (c) b* value in an L*a*b* color system when preserved at 40° C. for 4 months. The viscosity (20° C.) was 50 Pa·s or higher and 600 Pa·s or lower for all of the samples.

The following (d) evaluation of syneresis was conducted by an evaluation method given below. The results are shown in Table 1.

(d) Evaluation of Syneresis

A clear resin pouch was filled with the acidic oil-in-water type emulsified condiment and hermetically sealed. After preservation at 40° C. for 4 months, the presence or absence of syneresis was confirmed from the surface of the resin pouch.

TABLE 1

| Raw material | Example 1 | Example 2 | Example 3 | Example 4 | Comparative Example 1 | Comparative Example 2 |
|---|---|---|---|---|---|---|
| Fresh water | 52 | 40.7 | 38.7 | 44.6 | 74.5 | 56.7 |
| Fermented vinegar (4% acetic acid) | 4.5 | 5.2 | 5.2 | 5.2 | 4.5 | 0.35 |
| Citric acid | 0.135 | 0.000 | 0.000 | 0.000 | 0.135 | 0.000 |
| Malic acid | 0.135 | 0.500 | 0.500 | 0.500 | 0.135 | 0.000 |
| Common salt | 2.3 | 2.3 | 2.3 | 2.3 | 2.3 | 2.3 |
| MSG | 0.4 | 0.4 | 0.4 | 0.4 | 0.1 | 0.1 |
| Aqueous crystalline glucose (glucose content: 91%) | 22.3 | 0.0 | 16.0 | 10.0 | 0.0 | 22.3 |
| Sucrose | 0.0 | 14.0 | 0.0 | 0.0 | 0.0 | 0.0 |
| 10% salted yolk | 3.3 | 2.0 | 2.0 | 2.0 | 3.3 | 3.3 |
| Sterilized albumen | 0.0 | 0.0 | 0.0 | 0.0 | 0.0 | 0.0 |
| Processed starch | 5.0 | 5.0 | 5.0 | 5.0 | 5.0 | 5.0 |
| Soybean oil | 10.0 | 30.0 | 30.0 | 30.0 | 10.0 | 10.0 |
| Total | 100.0 | 100.0 | 100.0 | 100.0 | 100.0 | 100.0 |
| Data |  |  |  |  |  |  |
| pH | 3.2 | 3.5 | 3.5 | 3.5 | 3.3 | 4.6 |
| Water activity | 0.93 | 0.95 | 0.94 | 0.95 | 0.97 | 0.94 |
| b* value after preservation at 40° C. for 4 months | 18 | 15 | 13 | 12 | 16 | 22 |
| Evaluation of syneresis after preservation at 40° C. for 4 months | Syneresis was absent | Syneresis was absent | Syneresis was absent | Syneresis was absent | Syneresis was present | Syneresis was present |

The results of the syneresis test demonstrate that the acidic oil-in-water type emulsified condiments of Examples 1 to 4 having a water activity of 0.90 to 0.96, a pH of 3.0 to 4.0, and a b* value of 10 to 20 in an L*a*b* color system when preserved at 40° C. for 4 months resist syneresis even after preservation for a long period.

By contrast, the acidic oil-in-water type emulsified condiment of Comparative Example 1 having a water activity of 0.97 and the acidic oil-in-water type emulsified condiment of Comparative Example 2 containing no chelating agent and having the b* value exceeding 20 are found to be susceptible to syneresis when preserved for a long period.

The protein content of Example 1 was 0.5%, and the protein contents of Examples 2 to 4 were 0.3%.

Example 5

An acidic oil-in-water type emulsified condiment was obtained in the same way as in Example 1 except that in Example 1, the content of fermented vinegar (4% acetic acid) was changed from 4.5% to 4.4%, 0.135% of citric acid and 0.135% of malic acid were changed to 0.015% of hydrochloric acid, 0.25% of citric acid, 0.01% of phosphoric acid, and 0.01% of lactic acid, and the difference was adjusted with fresh water. The obtained acidic oil-in-water type emulsified condiment had a pH of 3.3 and a water activity of 0.93. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 6

An acidic oil-in-water type emulsified condiment was obtained in the same way as in Example 1 except that in Example 1, 0.135% of citric acid and 0.135% of malic acid were changed to 0.25% of citric acid, 0.01% of gluconic acid, and 0.01% of succinic acid. The obtained acidic oil-in-water type emulsified condiment had a pH of 3.5 and a water activity of 0.93. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 7

An acidic oil-in-water type emulsified condiment was obtained in the same way as in Example 1 except that in Example 1, 0.135% of citric acid and 0.135% of malic acid were changed to 0.25% of citric acid and 0.02% of fumaric acid. The obtained acidic oil-in-water type emulsified condiment had a pH of 3.5 and a water activity of 0.93. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 8

An acidic oil-in-water type emulsified condiment was obtained in the same way as in Example 1 except that in Example 1, 20% of aqueous crystalline glucose and 1% of fructose were used as sugars, and the difference was adjusted with fresh water. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 9

An acidic oil-in-water type emulsified condiment was obtained in the same way as in Example 1 except that in Example 1, 20% of aqueous crystalline glucose and 1% of sorbitol were used as sugars, and the difference was adjusted with fresh water. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 10

An acidic oil-in-water type emulsified condiment was obtained in the same way as in Example 1 except that in Example 1, 20% of aqueous crystalline glucose and 1% of polydextrose were used as sugars, and the difference was adjusted with fresh water. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 11

An acidic oil-in-water type emulsified condiment was obtained in the same way as in Example 4 except that in Example 4, 0.5% of malic acid was changed to 0.5% of phosphoric acid. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 12

An acidic oil-in-water type emulsified condiment was obtained in the same way as in Example 4 except that in Example 4, 0.5% of malic acid was changed to 0.5% of gluconic acid. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 13

An acidic oil-in-water type emulsified condiment was obtained in the same way as in Example 4 except that in Example 4, 0.5% of malic acid was changed to 0.5% of fumaric acid. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 14

An acidic oil-in-water type emulsified condiment was obtained in the same way as in Example 4 except that in Example 4, 9% of aqueous crystalline glucose and 1% of fructose were used as sugars. The obtained acidic oil-in-water type emulsified condiment had a pH of 3.5 and a water activity of 0.95. Also, this acidic oil-in-water type emulsified condiment had a b* value of 15 to 18 in an L*a*b* color system when preserved at 40° C. for 4 months, and produced favorable results (syneresis was absent) in the evaluation of syneresis.

Example 15

An acidic oil-in-water type emulsified condiment was obtained in the same way as in Example 1 except that the following raw materials were used:

| [Formulation Table 1] | |
|---|---|
| Fresh water | 45% |
| Fermented vinegar (acetic acid: 4%) | 4.5% |
| Citric acid | 0.135% |
| Malic acid | 0.135% |
| Common salt | 2.3% |
| Aqueous crystalline glucose (glucose content: 91%) | 11.1% |
| Sucrose | 10.2% |
| 10% salted yolk (protein content in yolk: 16.5%) | 3.3% |
| Sterilized albumen (protein content: 10%) | 8% |
| Processed starch | 5% |
| Xanthan gum | 0.3% |
| Soybean oil | 10% |
| Total | 100% |

The obtained acidic oil-in-water type emulsified condiment had a pH of 3.4, a water activity of 0.94, and a viscosity (20° C.) of 220 Pa·s. Also, this acidic oil-in-water type emulsified condiment had a b* value of 10 to 20 in an L*a*b* color system when preserved at 40° C. for 4 months, and produced favorable results (syneresis was absent) in the evaluation of syneresis.

Example 16

An acidic oil-in-water type emulsified condiment was obtained in the same way as in Example 1 except that the following raw materials were used:

| [Formulation Table 2] | |
|---|---|
| Fresh water | 43.3% |
| Fermented vinegar (acetic acid: 4%) | 4.5% |
| Citric acid | 0.135% |
| Malic acid | 0.135% |
| Common salt | 2.3% |
| Sodium glutamate | 0.4% |
| Aqueous crystalline glucose (glucose content: 91%) | 20% |
| Sucrose | 15% |
| 10% salted yolk (protein content in yolk: 16.5%) | 3.3% |
| Processed starch | 6.0% |
| Soybean oil | 5% |
| Total | 100% |

The obtained acidic oil-in-water type emulsified condiment had a pH of 3.5, a water activity of 0.91, and a viscosity (20° C.) of 253 Pa·s. Also, this acidic oil-in-water type emulsified condiment had a b* value of 17 in an L*a*b* color system when preserved at 40° C. for 4 months, and produced favorable results (syneresis was absent) in the evaluation of syneresis.

Comparative Example 3

An acidic oil-in-water type emulsified condiment was obtained in the same way as in Example 1 except that the following raw materials were used:

[Formulation Table 3]

| | |
|---|---|
| Fresh water | 27% |
| Fermented vinegar (acetic acid: 4%) | 6% |
| Lactic acid | 0.4% |
| Common salt | 0.25% |
| Sucrose | 2.75% |
| 10% salted yolk (protein content in yolk: 16.5%) | 6.6% |
| Skimmed milk (protein content: 34%) | 2% |
| Soybean oil | 55% |
| Total | 100% |

The obtained acidic oil-in-water type emulsified condiment had a pH of 3.9, a water activity of 0.98, and a viscosity (20° C.) of 88 Pa·s. Also, this acidic oil-in-water type emulsified condiment had a b* value of 27 in an L*a*b* color system when preserved at 40° C. for 4 months, and evident syneresis was found in the results of evaluating syneresis.

What is claimed is:

1. An acidic oil-in-water type emulsified condiment comprising one or more chelating agents selected from citric acid, malic acid, phosphoric acid, lactic acid, succinic acid, fumaric acid, gluconic acid, and EDTA, acetic acid, glucose, a yolk, an edible oil, a thickener, and water, wherein
   the content of the edible oil is 1 to 30% by mass, and
   the content of glucose is 8.19% or larger and 40% or smaller by mass, and
   the content of the acetic acid is 0.001 to 0.7% by mass, and
   the content of a protein is 0.2 to 3% by mass, and
   the acidic oil-in-water type emulsified condiment has
      a water activity of 0.90 to 0.96,
      a pH of 3.0 to 4.0,
      a viscosity (20° C.) of 50 to 600 Pa·s, and
      a b* value of 10 to 20 in an L*a*b* color system when preserved at 40° C. for 4 months.

2. The acidic oil-in-water type emulsified condiment according to claim 1, wherein the content of the edible oil is 1 to 20% by mass.

3. The acidic oil-in-water type emulsified condiment according to claim 1, wherein the content of the glucose is 9.1% or larger and 30% or smaller by mass.

4. The acidic oil-in-water type emulsified condiment according to claim 1, wherein the water activity is 0.91 to 0.95.

5. The acidic oil-in-water type emulsified condiment according to claim 3, wherein the water activity is 0.91 to 0.95.

6. The acidic oil-in-water type emulsified condiment according to claim 1, wherein the pH is 3.2 to 3.7.

7. The acidic oil-in-water type emulsified condiment according to claim 3, wherein the pH is 3.2 to 3.7.

8. The acidic oil-in-water type emulsified condiment according to claim 5, wherein the pH is 3.2 to 3.7.

* * * * *